(12) United States Patent
Savitzky et al.

(10) Patent No.: US 12,524,215 B2
(45) Date of Patent: Jan. 13, 2026

(54) AUTOMATED RESOURCE DISTRIBUTION USING CODED DISTRIBUTION RULES

(71) Applicant: eShares, Inc., San Francisco, CA (US)

(72) Inventors: Adam Nathan Savitzky, Richmond, CA (US); Sahas Singh, Washington, DC (US); Desmond Robert Duggan, Mercer Island, WA (US); Arash Shahkar, Toronto (CA); Alex John Bakker, Brantford (CA)

(73) Assignee: eShares, Inc., San Francisco, CA (US)

( * ) Notice: Subject to any disclaimer, the term of this patent is extended or adjusted under 35 U.S.C. 154(b) by 0 days.

(21) Appl. No.: 18/437,935

(22) Filed: Feb. 9, 2024

(65) Prior Publication Data

US 2025/0258661 A1 Aug. 14, 2025

(51) Int. Cl.
*G06F 8/41* (2018.01)
*G06Q 40/06* (2012.01)
(52) U.S. Cl.
CPC ............. *G06F 8/427* (2013.01); *G06Q 40/06* (2013.01)
(58) Field of Classification Search
None
See application file for complete search history.

(56) References Cited

U.S. PATENT DOCUMENTS

| 11,068,472 | B2 | 7/2021 | Tulsi et al. | |
| 11,625,783 | B1 * | 4/2023 | Gordon, III | G06Q 20/065 705/37 |
| 2013/0110697 | A1 | 5/2013 | Duzoglou | |
| 2019/0294633 | A1 | 9/2019 | Dembo | |
| 2020/0034772 | A1 | 1/2020 | Balan | |
| 2020/0342544 | A1 | 10/2020 | Drangmeister et al. | |
| 2023/0230054 | A1 | 7/2023 | Livesay | |

FOREIGN PATENT DOCUMENTS

| KR | 10-2023-0013345 A | 1/2023 |
| KR | 10-2023-0167482 A | 12/2023 |
| WO | WO2016/070271 | 5/2016 |

OTHER PUBLICATIONS

Huber, Mag. Alexander; A Semi-Automatic Parse Tree Generator to Generate DesignSpace Models; Johannes Kepler University ePub; Aug. 2021; pp. 1-86 (Year: 2021).*

(Continued)

*Primary Examiner* — Jason M. Borlinghaus
(74) *Attorney, Agent, or Firm* — Fish & Richardson P.C.

(57) ABSTRACT

Methods, systems, and apparatus, including computer programs encoded on computer storage media, for generating an exit scenario output that characterizes an exit scenario for a business enterprise. In one aspect, a method comprises receiving, at an execution engine, data that represents ownership of assets by multiple participants and source code that defines distribution rules of distributing the assets over one or more steps among the multiple participants using a programming language; receiving, at the execution engine, an exit scenario input; automatically parsing, by the execution engine, the distribution rules defined in the source code into a parse tree; and interpreting, by the execution engine, the parse tree to produce an exit scenario output.

16 Claims, 5 Drawing Sheets

(56) References Cited

OTHER PUBLICATIONS

Huber, Mag. Alexander; A Semi-Automatic Parse Tree Translator to Generate DesignSpace Models; Johannes Kepler University ePub; Aug. 2021; pp. 1-89 (Year: 2021).*
Alibaba Cloud. What is Source Code and How to Read It. Jan. 13, 2022. (Year: 2022).*
International Search Report and Written Opinion in International Appln. No. PCT/US2025/011713, mailed on May 1, 2025, 11 pages.

* cited by examiner

AUTOMATED RESOURCE DISTRIBUTION USING CODED DISTRIBUTION RULES

TECHNICAL FIELD

This specification relates to automated distribution of resources.

BACKGROUND

The concept of distributing resources finds application in a number of fields. For example, in the field of computer technology, resources can include processing resources, communication bandwidth, or data storage mediums, among other examples. In a distributed computing system that includes multiple computing nodes, these resources can be distributed among the computing nodes in accordance with predetermined distribution rules and/or other requirements, such as overall performance metric of the system.

Resources can also involve non-computing resources including consumable value, such as physical or digital assets. For example, in the field of capital investment, resources can include equity. The equity value (e.g., enterprise value) of a business enterprise is based on the potential of that business to generate profits, which are in turn allocated to the owners of the equity according to the rights and preferences of the various classes of stock. The equity value attributable to various shareholders is therefore based on the total amount of stock issued among the different classes issued at various times.

Equities in a business enterprise can be managed by using a capitalization table. A capitalization table, also known as a "cap table," is a dynamic record showing the composition of a company's equity ownership. Capitalization tables have been utilized to facilitate the calculation and reporting of ownership interests. When the business distributes capital to its shareholders, the way those proceeds are allocated depends on the composition of the capitalization table and one or more distribution rules that govern the rights and preferences of the various classes of shares. When computing allocations, these distribution rules are traditionally encoded in a spreadsheet and are applied to data values included in a capitalization table. Distribution rules defined in a spreadsheet form have a number of drawbacks that make traditional approaches for calculating and allocating proceeds across ownership interests generally unsatisfactory.

For example, many conventional approaches, e.g., using spreadsheets, rely on manual data entry and formula creation. Manually entering data and creating formulas in a spreadsheet is tedious and error prone. When customized annotations or tags are used by one person, they may result in misinterpretation by others.

Furthermore, many conventional spreadsheets lack centralized version control or automatic tracking of changes and version history. Not only does this makes it difficult to identify and undo errors, but it also jeopardizes proper management of equities when a first party which manages one version of the spreadsheet makes updates to their version but fails to send the updated version to a second party, which manages another version of the spreadsheet.

All of these problems mean that traditional ways of using spreadsheet-based distribution rules for managing equities in a business enterprise result in a time-consuming and labor-intensive process that is difficult to get working at all, does not scale well, and does not generalize to other business enterprises.

SUMMARY

This specification describes a system, implemented as computer programs on one or more computers in one or more locations, that receives data representing ownership of assets by multiple participants and source code defining distribution rules for distributing assets among the multiple participants. The system also processes the ownership data and the source code to generate an exit scenario (also referred to as a "liquidity event") output. For example, the exit scenario output can specify a value of a corresponding portion of the assets to be received by each of one or more of the multiple participants.

In general, one innovative aspect of the subject matter described in this specification can be embodied in methods that include the actions of: receiving, at an execution engine, data that represents ownership of assets by multiple participants and source code that defines distribution rules of distributing the assets over one or more steps among the multiple participants using a programming language; receiving, at the execution engine, an exit scenario input; automatically parsing, by the execution engine, the distribution rules defined in the source code into a parse tree; and interpreting, by the execution engine, the parse tree to produce an exit scenario output.

These and other implementations can each optionally include one or more of the following features. In some aspects, the data that represents ownership of assets by multiple participants may comprise a capitalization table. In some aspects, the programming language may be a domain specific language. In some aspects, for each step, the distribution rules may comprise one or more participation conditions that specify which of the multiple participants are included in a subset of the multiple participants corresponding to the step. In some aspects, the participation condition may be defined with respect to attributes of the multiple participants. In some aspects, for each step, the distribution rules may comprise one or more distribution methods that specify how the assets should be distributed among a subset of the multiple participants corresponding to the step. In some aspects, for each step, the distribution rules may comprise one or more breakpoint conditions that specify when the distribution of the assets among the subset of the multiple participants corresponding to the step should terminate. In some aspects, the exit scenario input may comprise a value of the assets. In some aspects, parsing the distribution rules defined in the source code into the parse tree may comprise: representing elements in the source code, comprising expressions representing numeric values and conditions defined over the expressions, as nodes of the parse tree. In some aspects, interpreting the parse tree to produce the exit scenario output may comprise making a function call from a parser library. In some aspects, the exit scenario output may specify a value of a corresponding portion of the assets to be received by each of one or more of the multiple participants. In some aspects, the actions may further comprise outputting the exit scenario output for presentation on a display device.

Other implementations of this and other aspects include corresponding systems and computer programs configured to perform the actions of the methods encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. Traditionally, distribution rules, e.g., waterfall distribution rules, are stipulated in complex legal documents, which are then encoded in a spreadsheet or table form. The distribution rules can be defined using a series of complicated formulas or by complex relationships between a large number of cells in a structure of the spreadsheet. Spreadsheet-based distribution rules have all the drawbacks mentioned above, and will additionally result in a resource distribution process that is computationally inefficient.

By using programming code that defines distribution rules which are otherwise embedded in a spreadsheet, the techniques described in this specification can quickly and accurately output data defining an allocation or a set of allocations, e.g., upon request, at predetermined time intervals, or whenever the equity value changes. Thus, defining and using a programmatic approach to defining distribution rules is more accurate and more computationally efficient than existing techniques that rely instead on rules embedded in a spreadsheet.

That is, the described resource distribution techniques more closely adhere to the applicable distribution rules, consume fewer computational resources, and are faster than existing techniques. In some cases, an accurate and efficient distribution process can simplify ownership management for companies, investors, and individuals. Simplified ownership management encourages more people to participate in systems for company ownership which, in turn, creates more owners.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
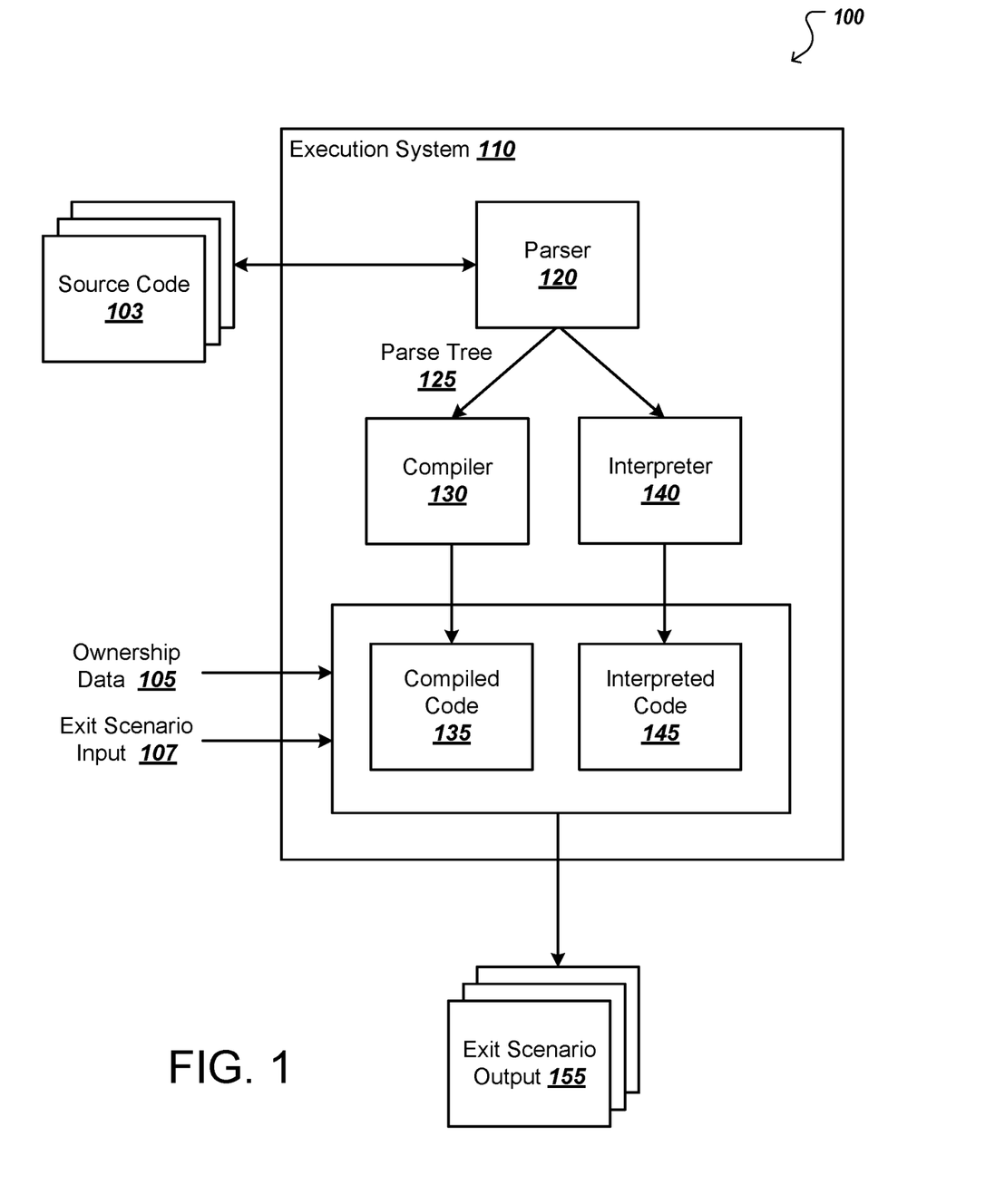
FIG. 1 illustrates an example execution environment.

FIG. 1 illustrates an example execution environment 100. The execution environment 100 includes an execution system 110. The execution system 110 is an example of a system implemented as computer program(s) on one or more computers in one or more locations that receives, as input, source code 103, ownership data 105, and an exit scenario input 107, and generates, based on the input, one or more exit scenario outputs 155. For example, the execution system 110 can provide the exit scenario output 155 for presentation to a user on a display device, store the exit scenario output 155 in a storage device for later use, or act upon the exit scenario output, e.g., by providing distribution instructions.

Each exit scenario output 155 characterizes an exit scenario for a business enterprise. Exits scenarios for a business enterprise include going public, or going private, or going bankrupt, to name just a few common examples. The business enterprise may have the same or different equity values under different exit scenarios. Different investors or owners may own the same or different amounts and types of shares (e.g., preferred stock issued within different series rounds, common stock, etc.) issued for the business enterprise.

For example, the equity value can represent the value of the assets (net of debt) of the business enterprise, and the shares owned by a shareholder can represent the proportionate share of the assets of the business enterprise that is owned by the shareholder. In some cases, the equity value constitutes the value of the shares of the business enterprise. In some cases, the calculation for equity value involves adding enterprise value, which is the sum of market capitalization and all of the debts in the business enterprise, to redundant assets (non-operating assets) and then subtracting the debt net of cash available.

To characterize a corresponding exit scenario for the business enterprise, in some implementations, each exit scenario output 155 can thus include data that defines an allocation. An allocation is a record of the proceeds each participant would receive in respect of their rights to, and preferences for, distribution proceeds and include data regarding how many of that participant's shares participated in the allocation. For example, for each participant (i.e., participating owner such as member, employee, investor and/or partner), the exit scenario output can include the respective value of the shares that are owned by the participant, e.g., the respective value of their proportionate share in the assets of the business enterprise. In some situations, when distributing proceeds among participants at the exit scenario, each participant would receive a portion of the proceeds that has the respective value as defined in the exit scenario output 155.

The ownership data 105 includes data that represents ownership of shares by multiple owners of the business enterprise. The ownership data 105 can be, or include, data in any format that is appropriate for representing shares ownership.

For example, the ownership data 105 can be specified in a capitalization table. The capitalization table can provide, for each type of participant, the number of outstanding and fully diluted shares, vesting schedule, capital account balances, and, in some cases, metadata such as identity of the participant and which group and/or share class to which the participant belongs. As another example, the ownership data 105 can be specified in a pro-forma capitalization table, which is the combination of the actual capitalization table and hypothetical modifications made to it. The capitalization table and/or the pro-forma capitalization table in these examples can, for example, be provided in a spreadsheet or another table form.

In some implementations, the ownership data 105 (or data based on which the ownership data 105 can be determined) is maintained in an extensible universal ledger as described in U.S. Ser. No. 11/068,472B2, the content of which is incorporated by reference into this specification in its entirety.

The exit scenario input 107 generally serves as a trigger signal that initiates the generation of the exit scenario output 155. For example, the exit scenario input 107 can include data that defines a particular exit scenario, a particular equity value, or both for the business enterprise. In response to receiving the exit scenario input 107, the execution system 110 calculates the values of the shares owned by the shareholders to generate the exit scenario output 155.

The source code 103 defines distribution rules for distributing the assets of the business enterprise among the multiple shareholders. In particular, instead of embedding these distribution rules as a part of the ownership data 105 (e.g., in a spreadsheet), a user of the execution system 110 writes programming code that includes expressions and/or statements that define the applicable distribution rules that govern the ways the assets of the business enterprise should be distributed during the distribution process.

For example, the distribution rules can include one or more participation conditions that specify, for each of one or more steps (also referred to as "breakpoints" or "tiers") over the distribution process, which of the multiple participants are included in the step. The participation condition can for example be defined with respect to the attributes of the multiple shareholders, e.g., group attributes that identify the shareholders as founders, investors, common stockholders, etc.

As another example, the distribution rules can define the allocation methods that specify how the assets should be distributed among the subset of the multiple participants corresponding to each of the one or more steps over the distribution process. For example, the distribution rules can define whether a Pari-Passu distribution method or a Pro Rata distribution method should be used at the step.

A Pari-Passu distribution method refers to a method for distributing assets where all participants share the assets equally. Pari-passu distribution methods are common in bankruptcy proceedings as well as debts such as parity bonds in which each participant receives the same amount. In contrast, a Pro rata distribution method refers to a method for distributing assets each participant receives their fair share in proportion to the whole. Pari-passu distribution methods can be used in many situations, including determining dividend payments, which are cash payments by corporations paid to shareholders.

As another example, the distribution rules can define one or more breakpoint conditions that specify when the distribution of the assets among the subset of the multiple participants corresponding to each of the one or more steps over the distribution process should terminate. The breakpoint conditions can for example be defined with respect to the value of the remaining assets of the business enterprise.

The source code 103 can be implemented in any of a variety of high-level programming languages. The high-level programming languages can include Java, Python, C++, or custom domain specific languages.

As a particular example of this, the source code 103 is written in a domain specific language used to define and simulate distribution waterfalls of the assets, e.g., a Niagara DSL. As a high level, Niagara DSL is a domain-specific language that differs from any conventional DSL in that it bridges the gap between legal text and computer code. Niagara DSL is straightforward for non-technical users. Niagara DSL is powerful enough to handle almost every conceivable distribution rule, while remaining concise, expressive, auditable, and testable. In particular, Niagara DSL is based on a custom grammar defined to express distribution rules with a simple, intuitive, and declarative (rather than imperative) syntax, which in general means that instead of telling a computer system how to solve a problem, a programmer could tell the computer system what the problem is and then the computer system solves the problem for the programmer. In the context of this specification, that means that the programmer could "declare" the distribution rules using Niagara DSL and then the execution engine interprets the rules and uses the interpretation to compute the allocations. The programmer need not know how to compute the allocations, and instead only needs to write code to define what the distribution rules are. In contrast, many other conventional domain-specific languages that could be used to encode distribution rules take an imperative approach, which makes them difficult to build a general purpose tool because the execution engine has to be re-coded every time a new distribution rule is defined. Repeatedly re-coding an execution engine is both time and resource (e.g., computing resource, energy resource, or both) consuming.

TABLE 1 includes an example of a source code snippet written to define two allocation steps. The first step is distribution of the return of invested capital to Series A investors, who, in this case are senior to (have liquidation preference over) the common investors. The second step is the distribution of proceeds to common shareholders alongside series A shareholders. The series A shareholders will be paid exclusively until they receive their invested capital back or the proceeds are exhausted, whichever comes first. Once that condition has achieved, the common shareholders strike in, participating alongside series A shareholders, receiving proceeds pro-rata respective of their number of shares held until all proceeds have been distributed.

TABLE 1

| | |
|---|---|
| 1 | ALLOCATE |
| 2 | -- Define participation condition |
| 3 | TO group_id( ) = "Series A" |
| 4 | -- Define allocation method |
| 5 | USING pro_rata( ) BY invested_capital( ) |
| 6 | -- Define breakpoint condition |
| 7 | UNTIL value_in_tier( ) = |
| 8 | sum_if(invested_capital( ), group_id( ) = "Series A") |
| 9 | |
| 10 | THEN ALLOCATE |
| 11 | TO group_id( ) IN ("Series A", "Common") |
| 12 | USING pro_rata( ) BY unit_quantity( ) |
| 13 | UNTIL all_proceeds_allocated( ) |
| 14 | ; |

TABLE 2 includes an example of a source code snippet written to define a more complicated waterfall with what is commonly referred to as a "catch-up" provision. In this example, investors are paid until they receive a 3x multiple of their invested capital or all proceeds are allocated, whichever comes first. Once that condition has been achieved, founders and CEO are paid until they have received a per-unit amount equal to the per-unit amount paid to investors or all proceeds have been allocated, whichever comes first. Within this tier, the proceeds are distributed such that 50% of all proceeds in the tier are allocated to the CEO, with the remainder being distributed to the other founders pro-rata respective of their participating shares. Once that condition has been achieved, all participants participate pro-rata respective of their participating share count until all proceeds have been distributed.

TABLE 2

| | |
|---|---|
| 1 | DEFINE is_investor = group_id( ) = "Investors"; |
| 2 | DEFINE returned_3x_invested_capital = |
| 3 | sum_if(invested_capital( ), is_investor) * 3; |
| 4 | DEFINE is_founder = group_id( ) = "Founders"; |
| 5 | DEFINE is_ceo = id( ) = "CEO"; |
| 6 | DEFINE investor_units = sum_if(unit_quantity( ), |
| 7 | is_investor) ; |
| 8 | |

TABLE 2-continued

| | |
|---|---|
| 9 | ALLOCATE |
| 10 | TO is_investor |
| 11 | USING pro_rata( ) BY invested_capital( ) |
| 12 | UNTIL value_in_tier = returned_3x_invested_capital |
| 13 | |
| 14 | THEN ALLOCATE |
| 15 | TO is_founder |
| 16 | USING pari_passu( ) |
| 17 | SHARE 50% TO is_ceo |
| 18 | SHARE 50% TO NOT is_ceo |
| 19 | USING pro_rata( ) BY unit_quantity( ) |
| 20 | UNTIL per_unit_value_in_tier( ) = |
| 21 | returned_3x_invested_capital / investor_units |
| 22 | THEN ALLOCATE |
| 23 | TO all_participants |
| 24 | UNTIL all_proceeds_allocated( ) |
| 25 | ; |

The execution system 110 can receive the source code 103 (and, analogously, the ownership data 105 and the exit scenario input 107) in any of a variety of ways.

For example, the execution system 110 can receive the source code 103 as an input from a remote user of the system over a data communication network, e.g., using an application programming interface (API) or another data interface made available by the execution system 110. In this example, the execution system 110 can then provide the exit scenario output 155 to the remote user through the API or the other data interface provided by the execution system 110.

As another example, the execution system 110 can be part of a software platform, e.g., a capitalization table management and valuation platform, and can receive the source code 103, among other data, from a user of the platform or from another component of the platform. In this example, the execution system 110 can then provide the exit scenario output 155 to the user or to the other component of the platform for further processing.

At a high level, the execution system 110 generates the exit scenario output 155 by using a parser 120 and a compiler 130 to translate the source code 103 from the high-level programming language to a lower-level language, such as assembly, object code, or machine code, to create an executable program, and then running the executable program over the ownership data 105 and the exit scenario input 107 to generate an exit scenario output 155 as program output.

The parser 120 is a software component of the execution system 110 that takes the source code 103 and builds a data structure to provide a structural representation of the code elements of the source code 103. For example, the parser 120 can analyze the source code 103 and/or break up the source code 103 into separate components, including breaking source code up into functions, variables, objects, or instances.

In the example of FIG. 1, the parser 120 parses the source code to obtain a parse tree 125. The parse tree 125 is a structural/hierarchical representation of the source code 103. For example, the parse tree 125 can indicate libraries, classes, functions, calls, etc. along with the relationships between them. In other examples, the parser 120 parses the source code to obtain different structures, e.g., a syntax tree such as an abstract syntax tree (AST).

Figure 2:
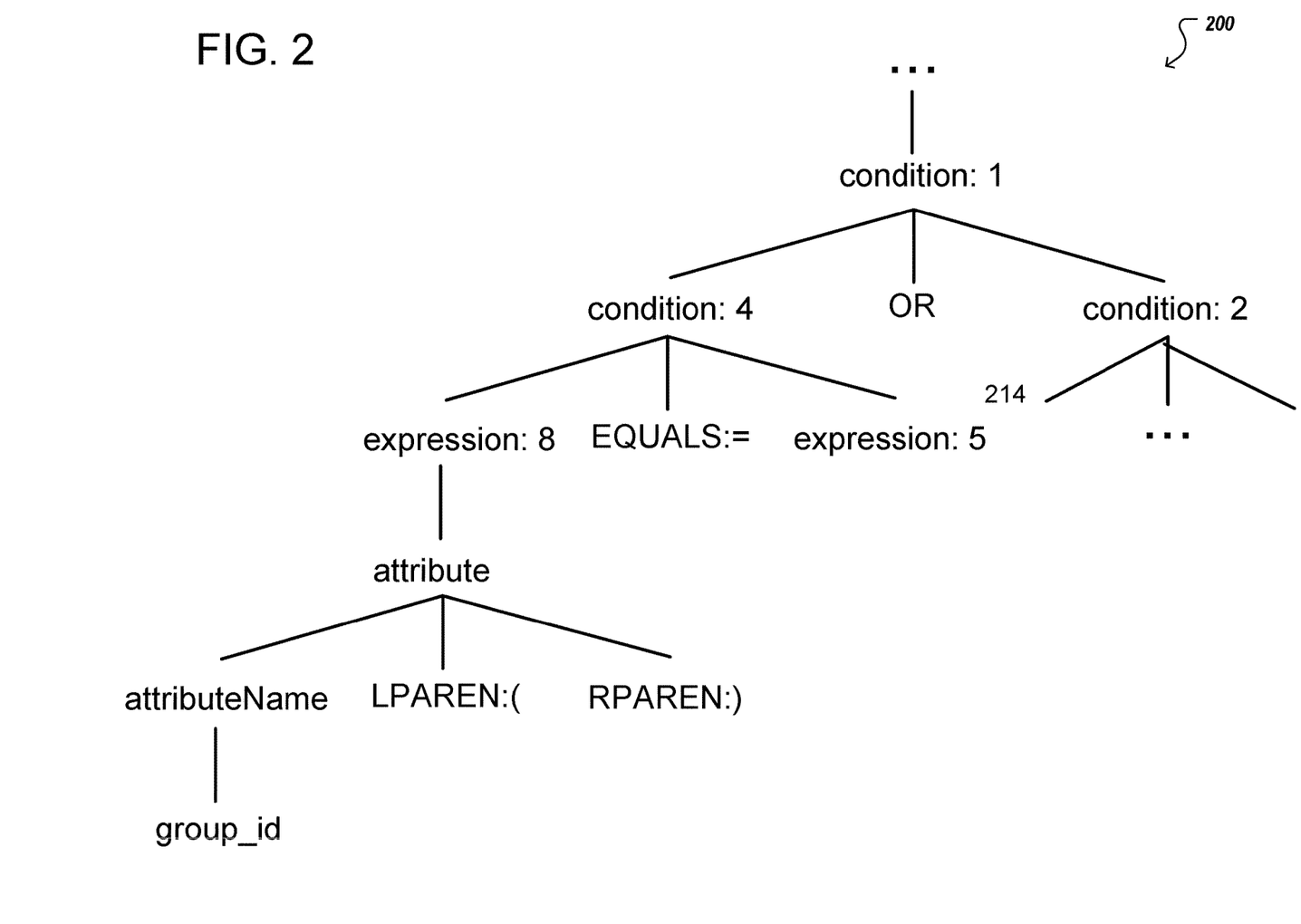
FIG. 2 illustrates an example of a portion of a parse tree.

FIG. 2 illustrates an example of a portion of a parse tree 200 that may be produced by the parser 120. As illustrated, parsing the source code to obtain a parse tree can involve creating nodes in the parse tree 200. For example, corresponding nodes would be created for various expressions included in the source code, such as "5," which resolves to numeric value 5, and "8," which resolves to numeric value 8. As another example, corresponding nodes would be created for various terminals in the expressions, such as "LPAREN" (or "left parenthesis," i.e., "(,") and "RPAREN," and operators in the expressions, such as "EQUALS" (or "="). As another example, corresponding nodes would be created for conditions defined over the expressions, such as "condition: 1" or "condition: 2." As yet another example, corresponding nodes would be created for various statements included in the source code, such as "attributeName," and "group id."

Referring back to FIG. 1, in some implementations, the parser 120 is associated with, e.g., is part of, a compiler 130. In these implementations, the compiler 130 is software component of the execution system 110 that performs various operations including, for example, lexical analysis, parsing, conversion of input programs to an intermediate representation, code optimization, and code generation to translate the source code 103 from a high-level programming language to compiled code 135 written in a lower-level language, such as assembly, object code, or machine code, to create an executable program. Specifically, the compiler 130 uses the parser 120 to perform parsing to generate the parse tree 125 that is used in the subsequent stages of the compilation process.

In some other implementations, the execution system 110 additionally, or alternatively, includes an interpreter 140. The interpreter 140 is a software component of the execution system 110 that interprets the source code 103 to generate interpreted code 145 to create an executable program, without requiring the source code 103 to have been compiled into compiled code 135.

The executable program can model any of a variety of distribution methods or waterfalls for distributing the proceeds from an exit scenario. Once the execution system 110 has the executable program, the ownership data 105, and the exit scenario input 107, the execution system 110 instantiates an appropriate execution environment, e.g., a virtual machine or a software container, to run the executable program over the ownership data 105 and the exit scenario input 107 to generate a program output. The program output includes the exit scenario output 155.

The exit scenario output 155 characterizes an exit scenario for the business enterprise, e.g., at the particular equity value, that is defined in the exit scenario input 107. The exit scenario can be a particular exit scenario when it is also defined in the exit scenario input 107. For example, the exit scenario output 155 can include data that defines, for each participating shareholder, the respective value of the shares that are owned by the participating shareholder, e.g., the respective value of their proportionate share in the proceeds of the exit scenario.

As a particular example, the executable program can model a distribution waterfall of the assets of the business enterprise. In this particular example, the exit scenario output of the executable program can indicate the values of the types of shares (e.g., preferred stock issued within different series rounds, common stock, etc.) issued for the business enterprise based on the particular equity value. Thus, at the particular equity value, the estimated price of all of the types of shares can be determined and quickly provided to the user in an easy-to-understand manner. For example, to determine an estimated share price for a particular class of shares, the executable program can aggregate the total allocated amount across all participants belonging to the particular class, and divide the aggregation by the total quantity of shares belonging to the particular class that participated in the distribution.

In addition to being used for exit modeling (or liquidity event modeling), some implementations of the execution system 110 of FIG. 1 can be used to compute distributions for modeling non-exit scenarios, e.g., by using another executable program generated based on the same or different distribution rules. Merely as an example, the execution system 110 can receive, as input, source code and ownership data and process the input to generate, as output, data that defines interim profit distributions (also referred to as "current distribution") of a business enterprise, e.g., monthly, quarterly, or annual profit distributions.

Figure 3:
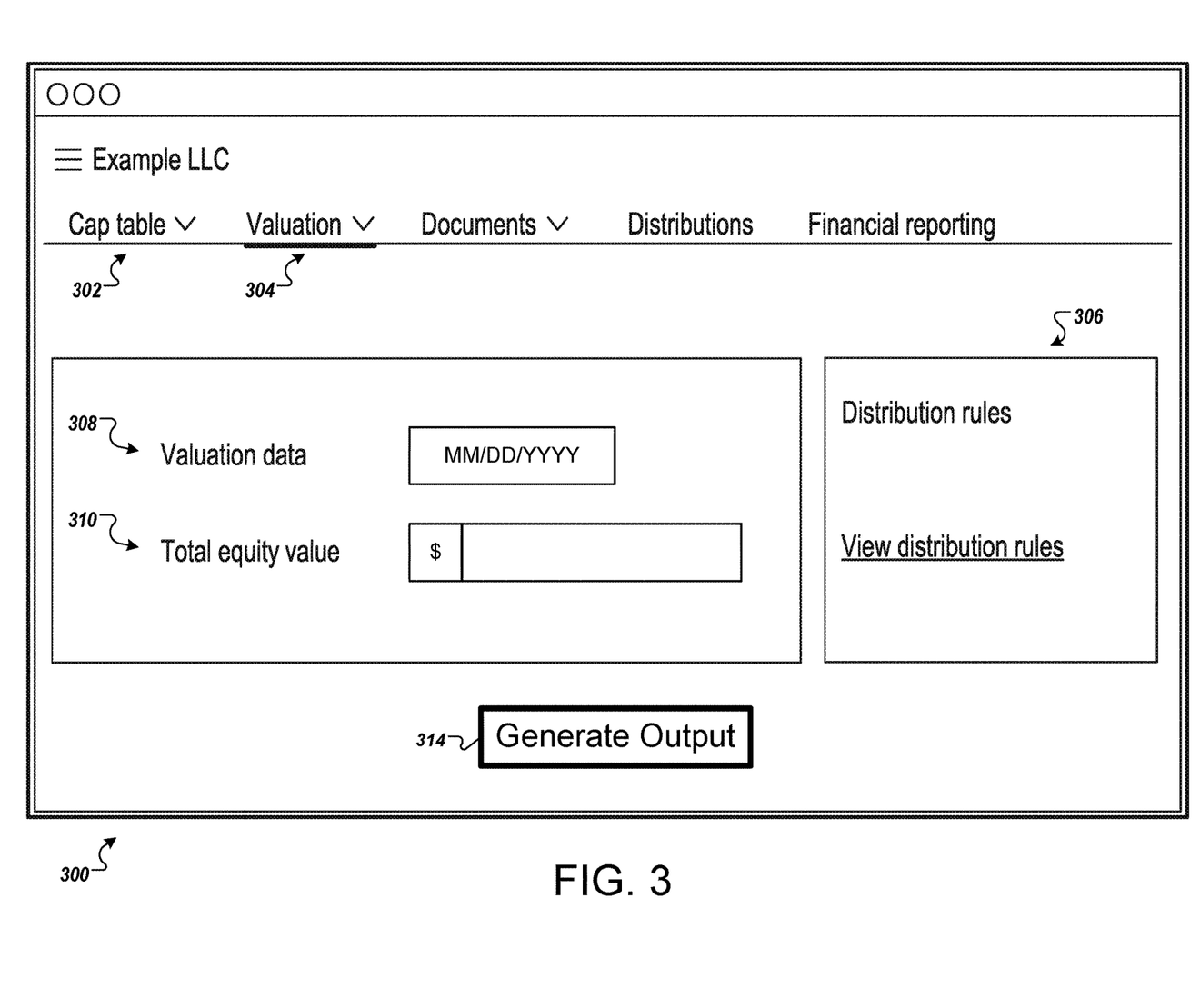
FIG. 3 illustrates an example of a user interface for generating an exit scenario output.

FIG. 3 illustrates an example of a user interface 300 for generating an exit scenario output. The user interface 300 can be displayed on a client device that is in data communication with the execution system 110 over a network, such as a local area network (LAN), a wide area network (WAN), the Internet.

Example client devices include personal computers, gaming devices, mobile communication devices, digital assistant devices, augmented reality devices, virtual reality devices, and other devices that can send and receive data over the network. A client device typically includes a user application, such as a web browser, to facilitate the sending and receiving of data over the network. For example, the user interface 300 in FIG. 3 can be presented in a web browser, but native applications (other than browsers) executed by the client device can also facilitate the sending and receiving of data over the network.

A user of the client device can use the user interface 300 to enter/review data to be used in automatically generating an exit scenario output for a business enterprise ("Example LLC"). As mentioned above, such data includes ownership data and an exit scenario input. To enter/review ownership data that is provided in the form of a capitalization table, the user can select the "Cap table" tab 302 of the user interface 300.

Capitalization tables usually include a list of names or groups (founders, investors, common stockholders, etc.) on one dimension and details around what they own (what type of securities, how many they own, when they invested, what percentage of the Example LLC they own, etc.) on the other dimension. A capitalization table may also show the Example LLC's option pool size, common shares, preferred shares, outstanding shares, and simple agreement for future equity (SAFE) documents to show a full picture of the overall ownership of Example LLC.

Upon selecting the "Cap table" tab 302, the user can view the capitalization table that is displayed therein as well as modify one or more aspects of the capitalization table. For example, the user can add a new capitalization table for Example LLC, e.g., by way of uploading a new spreadsheet; the user can update the content of the capitalization table, e.g., add a new name to an existing group, add a new group, or add new rows for a most recent round of financing for Example LLC; and the user can partially or completely delete an existing capitalization table for Example LLC.

The user can select the "Valuation" tab 304 of the user interface 300 to enter/review the exit scenario input. As illustrated, the "Valuation" tab 304 allows the user to enter/review distribution rules 306. These distribution rules are rules that must be followed when distributing proceeds of an exit scenario for Example LLC among its participating shareholders. In particular, the distribution rules are defined in source code written in any of a variety of high-level programming language, e.g., a domain specific language (DSL).

Thus, upon selecting "view distribution rules," the user can provide source code, e.g., source code written in a domain specific language, in an editor of an integrated development environment (IDE) provided by the execution system. For example, the user can write expressions and/or statements to define a particular participation condition for one or more investors to participate in a particular step of the distribution process. The user interface 300 can allow the user to provide the source code either in place of, or in addition to, providing free-form text written in a natural language that describes the distribution rules.

Defining distribution rules in DSL source code facilitates the creation, maintenance, and subsequent application of distribution rules that are arbitrarily complex, e.g., have a complexity beyond human comprehension. Generally, the complexity arises when there are a large number of participants, a large, potentially infinitely large, number of configurations for each distribution rule, or both. For example, when the number of participants, e.g., the number of investors, is higher than 10, or 100, or 1000, the number of configurations of each distribution rule is higher than 10, or 100, or 1000, or both, the system can apply the distribution rules during the distribution of an exit scenario proceeds within a time period of less than 1 second, less than 30 seconds, or less than one minute.

As illustrated in FIG. 3, the "Valuation" tab 304 also allows the user to enter/review the valuation date 305, total equity value 310 (in other implementation equity value could be replaced with proceeds value), and, optionally, vesting treatment.

Valuation date 308 refers to the date that is used to decide the "as of" date of the capitalization table/data. When generating the exit scenario output, the execution system will use this "as of" date to determine vesting of equity awards and any interest or dividend accrual amounts.

Total equity value 310 refers to the value of the assets of Example LLC (e.g., the amount of cash of Example LLC) that the execution system will use to calculate payouts, e.g., to calculate the respective value of the proportionate share in the assets of Example LLC to be distributed to each participating shareholder.

Vesting treatment is an optionally input field that allows the user to accelerate vesting. Default behavior follows the vesting schedule up to the exit date, and accelerated vesting calculates payouts assuming all interests have vested at the date of valuation.

After having reviewed/entered all the required data, the user can click the "generate output" button 314 to generate an exit scenario output for Example LLC. In particular, the execution system generates the exit scenario output by creating an executable program based on the source code provided by the user, and then running the executable program over the ownership data and the exit scenario input. The exit scenario output can be viewed by the user within the user interface 300 and/or saved to a storage device for later use.

This configuration of the execution system facilitates a distribution process that is customizable and fast to execute (e.g., within a time period of less than 1 second, less than 30 seconds, or less than one minute). Through the user interface 300 in FIG. 3, the user can provide different exit scenario proceeds to view quickly possible exit scenario outputs that are based on different exit scenario proceeds for Example LLC. The user can also provide different sets of distribution rules to quickly view multiple possible exit scenario outputs that are based on the same exit scenario proceeds for the Example LLC but distributes the proceeds by following different distribution rules.

As a particular example, if the user wants to know what the value of shares purchased by respective investors are for Example LLC at a first equity value, then the user can provide an exit scenario input defining the first equity value and the execution system can process the exit scenario input to determine the value of shares accordingly. If the user next wants to know the updated value for shares at a second equity value, then the user can provide another exit scenario input defining the second equity value and the execution system can quickly process the exit scenario input to determine the updated value of shares accordingly.

Because the execution system generates these exit scenario outputs based on automatically parsing and/or interpreting coded distribution rules, the execution system can do this under strict timing requirements. As one example, an exit scenario output can be generated within a predetermined time (e.g., within 10 milliseconds, or within 200 milliseconds, or within 1 second) in response to receiving an exit scenario input. This is a vast improvement over traditional methods, which require teams of many professionals to work for many days or weeks to manually interpret the distribution rules and compute the numbers in accordance with the interpretation of these rules that do not generalize any other exit scenarios.

To show the complexity that would otherwise be involved in such traditional methods, an example scenario where an iterative distribution rule is applied in order to distribute assets in two classes: class A shares and Management Incentive Units (MIUs), will now be described. Note that this example is merely for illustrative purposes. In the real-world, the vesting rules can be more complicated, and there can be hundreds, thousands, or more participants. In addition to MOIC, the performance conditions may also depend on the internal rate of return (IRR) for each investor, which may be time-dependent, and may need to be determined in iterative manner. In addition, calculating MOIC or IRR can involve allocations across multiple breakpoints, rather than just two (as in the example below). All of these issues increase the complexity of applying distribution rules using traditional methods.

In this example, the MIUs vest based on time and performance. The performance condition vests depending on the multiple of invested capital received by Class A shareholders (MOIC). Suppose, for example, when MOIC>4, the MIUs vest at 150% of their nominal quantity; when MOIC>3 and <4, the MIUS vest 120% of their nominal quantity; when MOIC>2 and <3, the MIUS vest at 80% of their nominal quantity; and when MOIC<2, the MIUS vest at 20% of their nominal quantity.

In this example, a waterfall distribution includes two steps. First, class A shareholders receive their invested capital. Then class A shareholders and MIUs shareholders share proceeds pro rata until all proceeds are distributed.

Assume that there are 100 outstanding class A units with $100 of invested capital, and 100 nominal MIU units. In a scenario where the total proceeds is $500, the following process needs to be iteratively performed in order to determine an amount of assets that the class A shareholders and MIUs shareholders can each receive.

In the first breakpoint, class A shareholders receives $100. Then, the number of MIU units to participate in the second breakpoint needs to be determined. In the first iteration, assuming a MOIC of 5×, then 150% of 100, or 150 MIU units participate. Thus, with 100 class A units and 150 MIU units participating, and $400 left to distribute, class A shareholders are expected to receive (100/250)*400=$160 in this breakpoint and MIUs shareholders are expected to receive the balance, or $240.

Summing the total allocations to class A shareholders provides $100+$160=$260. Then, the process returns to check its initial guess for MOIC and see if it was right. In this case, MOIC=260/100, or 2.6. The initial guess, which is 5, turns out to be too high. The process proceeds to another iteration where 2.6 is plugged back in as the guess for MOIC.

In the second breakpoint, assuming 80 MIU units to participate, this gives a distribution of (100/180)*400=222.2 for class A shareholders and 188.78 for MIUs shareholders. In this iteration, MOIC=2.22, which is closer to our guess of 2.6, but not exactly, so the process proceeds to yet another iteration. This process keeps iterating until the guess converges on the actual MOIC or a predetermined maximum number of iterations is reached.

Figure 4:
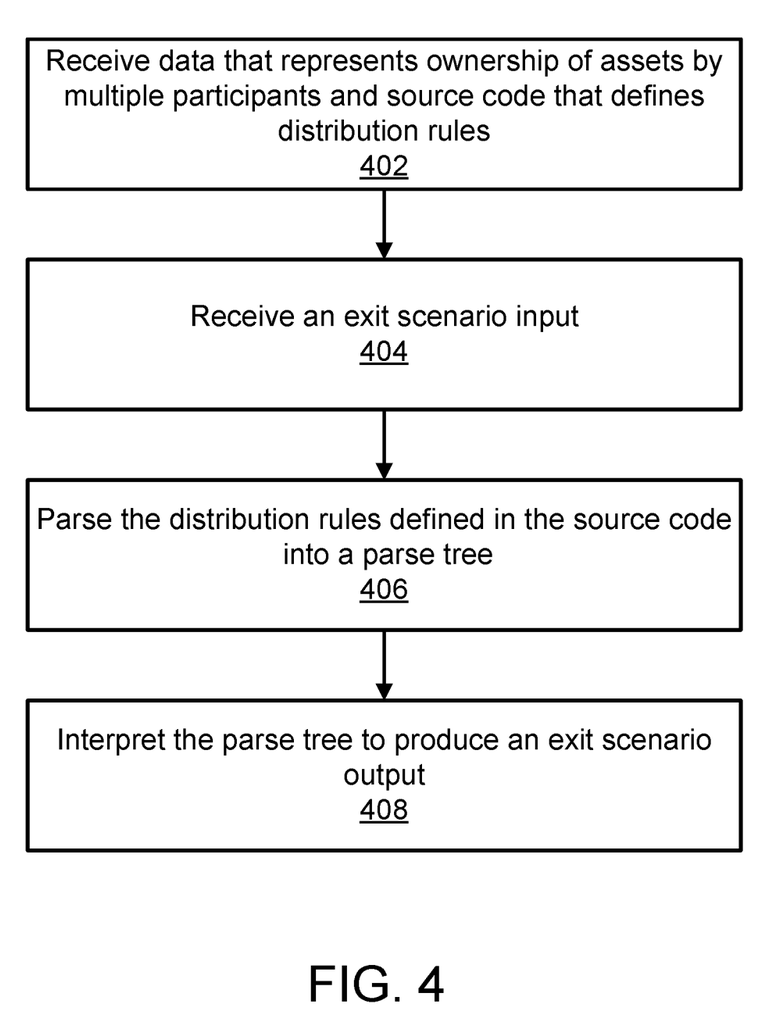
FIG. 4 is a flow diagram of an example process for generating an exit scenario output.

FIG. 4 is a flow diagram of an example process 400 for generating an exit scenario output. For convenience, the process 400 will be described as being performed by a system of one or more computers located in one or more locations. For example, an execution system, e.g., the execution system 110 of FIG. 1, appropriately programmed, can perform the process 400.

The system receives data that represents ownership data and source code (step 402).

The ownership data represents ownership of assets of a business enterprise by multiple participants. For example, the ownership data can include a funding history table, a capitalization table, or both, that include data that defines ownership of shares by multiple inventors of the business enterprise.

The source code defines distribution rules of distributing the assets of the business enterprise over one or more steps among the multiple participants. The source code can be written in any of a variety of high-level programming language, e.g., a domain specific language.

For example, the system can receive the ownership data and source code from one or more users of the system as one or more inputs over a data communication network. In some cases, the system receives the ownership data together with the source code, e.g., from the same user. Alternatively, in some other cases, the system receives the source code before the system has any ownership data to run it on. When the system receives ownership data from a user that data could optionally include metadata specifying what distribution rules are applicable to the distribution process of assets represented by the ownership data.

The system receives an exit scenario input (step 404). The exit scenario input can include data that defines a particular exit scenario, a particular equity value, or both for the business enterprise. For example, the exit scenario input can define a value of the business enterprise as of a valuation date.

The system automatically parses the distribution rules defined in the source code into a parse tree (step 406). The system can do this by using a parser that can analyze the source code and/or break up the source code into separate components, including breaking source code up into functions, variables, objects, or instances. In some implementations, the parsing process of the source code is independent from any specific programming language so any parser that can produce a parse tree from source code can be used.

The system interprets the parse tree to produce an exit scenario output (step 408). Interpreting the parse tree can include making one or more function calls from a library associated with the parser. In some implementations, the parser is associated with, e.g., is part of, a compiler, which can translate the source code from a high-level programming language according to the parse tree to compiled code to create an executable program. In some other implementations, the system interprets the source code to generate interpreted code to create an executable program.

Once the system has the executable program, the ownership data, and the exit scenario input, the system can instantiate an execution environment to run the executable program. The system provides the ownership data and the exit scenario input as program input to the executable program to run the executable to process the program input to generate a program output that includes the exit scenario output.

For example, the exit scenario output can specify a value of a corresponding portion of the assets of the business enterprise to be received by each of one or more of the multiple inventors of the business enterprise.

Figure 5:
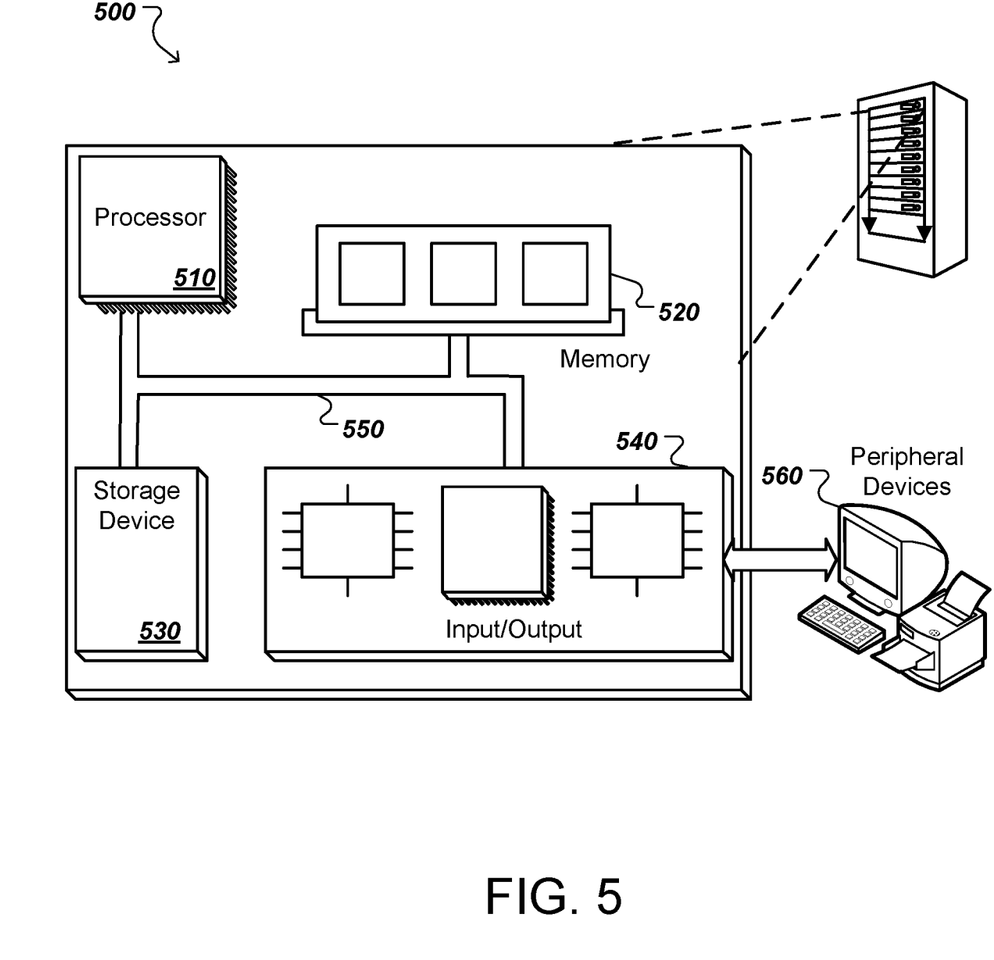
FIG. 5 is a block diagram of an example computer system that can be used to perform operations described herein.
Like reference numbers and designations in the various drawings indicate like elements.

FIG. 5 is a block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, at an execution engine, data that represents ownership of assets by multiple participants and source code that defines distribution rules of distributing the assets over one or more steps among the multiple participants using a domain specific language, wherein the domain specific language has a custom grammar specifically configured to express distribution rules, and wherein the source code comprises (i) code elements representing participation condition expressions that define, for each of the one or more steps, which ones of the multiple participants are included in the each of the one or more steps and (ii) code elements representing distribution method expressions that define, for the each of the one or more steps, a distribution method to be used to distribute the assets across the multiple participants that are included in the step;
receiving, at the execution engine, an exit scenario input;
generating, from the source code, a parse tree data structure that provides a structural representation of the code elements that represent the participation condition expressions and the code elements that represent the distribution method expressions, wherein generating the parse tree data structure comprises automatically parsing, by a software parser of the execution engine, the distribution rules defined in the source code into the parse tree data structure that comprises nodes that represent the participation condition expressions included in the source code and nodes that represent the distribution method expressions included in the source code;
generating, by the execution engine, in accordance with the exit scenario input and based on interpreting the parse tree data structure, an exit scenario output, wherein the exit scenario output specifies a value of a corresponding portion of the assets that, in accordance with the distribution rules defined in the source code, should be received by each of one or more of the multiple participants; and
providing the exit scenario output for display on a display device in response to receiving the exit scenario input.

2. The method of claim 1, wherein the data that represents ownership of assets by multiple participants comprises a capitalization table.

3. The method of claim 1, wherein for each step, the distribution rules comprise one or more participation conditions that specify which of the multiple participants are included in a subset of the multiple participants corresponding to the step.

4. The method of claim 3, wherein the participation condition is defined with respect to attributes of the multiple participants.

5. The method of claim 1, wherein for each step, the distribution rules comprise one or more distribution methods that specify how the assets should be distributed among a subset of the multiple participants corresponding to the step.

6. The method of claim 1, wherein for each step, the distribution rules comprise one or more breakpoint conditions that specify when the distribution of the assets among the subset of the multiple participants corresponding to the step should terminate.

7. The method of claim 1, wherein the exit scenario input comprises a value of the assets.

8. The method of claim 1, wherein parsing the distribution rules defined in the source code into the parse tree data structure comprises:
representing elements in the source code, comprising expressions representing numeric values and conditions defined over the expressions, as nodes of the parse tree data structure.

9. The method of claim 1, wherein interpreting the parse tree data structure to generate the exit scenario output comprises making a function call from a parser library.

10. The method of claim 1, wherein the exit scenario output specifies a value of a corresponding portion of the assets to be received by each of one or more of the multiple participants.

11. A system comprising one or more computers and one or more storage devices storing instructions that when executed by the one or more computers cause the one or more computers to perform operations comprising:
receiving, at an execution engine, data that represents ownership of assets by multiple participants and source code that defines distribution rules of distributing the assets over one or more steps among the multiple participants using a domain specific language, wherein the domain specific language has a custom grammar specifically configured to express distribution rules, and wherein the source code comprises (i) code elements representing participation condition expressions that define, for each of the one or more steps, which ones of the multiple participants are included in the each of the one or more steps and (ii) code elements representing distribution method expressions that define, for the each of the one or more steps, a distribution method to be used to distribute the assets across the multiple participants that are included in the step;
receiving, at the execution engine, an exit scenario input;
generating, from the source code, a parse tree data structure that provides a structural representation of the code elements that represent the participation condition expressions and the code elements that represent the distribution method expressions, wherein generating the parse tree data structure comprises automatically parsing, by a software parser of the execution engine, the distribution rules defined in the source code into the parse tree data structure that comprises nodes that represent the participation condition expressions included in the source code and nodes that represent the distribution method expressions included in the source code;
generating, by the execution engine, in accordance with the exit scenario input and based on interpreting the parse tree data structure, an exit scenario output, wherein the exit scenario output specifies a value of a corresponding portion of the assets that, in accordance with the distribution rules defined in the source code, should be received by each of one or more of the multiple participants; and
providing the exit scenario output for display on a display device in response to receiving the exit scenario input.

12. The system of claim 11, wherein the data that represents ownership of assets by multiple participants comprises a capitalization table.

13. The system of claim 11, wherein the exit scenario input comprises a value of the assets.

14. The system of claim 11, wherein parsing the distribution rules defined in the source code into the parse tree data structure comprises:

representing elements in the source code, comprising expressions representing numeric values and conditions defined over the expressions, as nodes of the parse tree data structure.

15. One or more non-transitory computer-readable storage media storing instructions that when executed by one or more computers cause the one or more computers to perform operations comprising:

receiving, at an execution engine, data that represents ownership of assets by multiple participants and source code that defines distribution rules of distributing the assets over one or more steps among the multiple participants using a domain specific language, wherein the domain specific language has a custom grammar specifically configured to express distribution rules, and wherein the source code comprises (i) code elements representing participation condition expressions that define, for each of the one or more steps, which ones of the multiple participants are included in the each of the one or more steps and (ii) code elements representing distribution method expressions that define, for the each of the one or more steps, a distribution method to be used to distribute the assets across the multiple participants that are included in the step;

receiving, at the execution engine, an exit scenario input;

generating, from the source code, a parse tree data structure that provides a structural representation of the code elements that represent the participation condition expressions and the code elements that represent the distribution method expressions, wherein generating the parse tree data structure comprises automatically parsing, by a software parser of the execution engine, the distribution rules defined in the source code into the parse tree data structure that comprises nodes that represent the participation condition expressions included in the source code and nodes that represent the distribution method expressions included in the source code;

generating, by the execution engine, in accordance with the exit scenario input and based on interpreting the parse tree data structure, an exit scenario output, wherein the exit scenario output specifies a value of a corresponding portion of the assets that, in accordance with the distribution rules defined in the source code, should be received by each of one or more of the multiple participants; and providing the exit scenario output for display on a display device in response to receiving the exit scenario input.

16. The computer-readable storage media of claim 15, wherein the data that represents ownership of assets by multiple participants comprises a capitalization table.

* * * * *